(12) United States Patent
Freisler et al.

(10) Patent No.: US 12,115,927 B2
(45) Date of Patent: Oct. 15, 2024

(54) FOLDING TABLE DEVICE AND VEHICLE HAVING A FOLDING TABLE DEVICE

(71) Applicant: ZF AUTOMOTIVE GERMANY GMBH, Alfdorf (DE)

(72) Inventors: Werner Freisler, Schwabisch Gmünd (DE); Simon Schmid, Heuchlingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/557,071

(22) PCT Filed: Apr. 21, 2022

(86) PCT No.: PCT/EP2022/060531
§ 371 (c)(1),
(2) Date: Oct. 25, 2023

(87) PCT Pub. No.: WO2022/228986
PCT Pub. Date: Nov. 3, 2022

(65) Prior Publication Data
US 2024/0239291 A1    Jul. 18, 2024

(30) Foreign Application Priority Data
Apr. 29, 2021  (DE) ............... 10 2021 111 034.3

(51) Int. Cl.
*B60R 21/233*      (2006.01)
*B60N 3/00*        (2006.01)
(Continued)

(52) U.S. Cl.
CPC ............ *B60R 21/231* (2013.01); *B60N 3/001* (2013.01); *B60R 21/217* (2013.01); *B60R 21/233* (2013.01); *B60R 2021/23107* (2013.01)

(58) Field of Classification Search
CPC ..................... B60R 21/233; B60R 21/207
See application file for complete search history.

(56) References Cited

U.S. PATENT DOCUMENTS

| 11,465,578 B1* | 10/2022 | Llamazares Domper .................. B60N 2/42727 |
| 11,577,680 B1* | 2/2023 | Faruque ................. B60N 3/002 |
| 2021/0094503 A1* | 4/2021 | Farooq ................... B60N 3/004 |

FOREIGN PATENT DOCUMENTS

| CN | 110001486 B * | 6/2021 | ............. B60N 3/001 |
| DE | 4131998 A1 | 7/1993 | |

(Continued)

OTHER PUBLICATIONS

PCT International Search Report for corresponding International Application Serial No. PCT/EP2022/060531, mailed Aug. 1, 2022, pp. 1-4.

*Primary Examiner* — Nicole T Verley
(74) *Attorney, Agent, or Firm* — Tarolli, Sundheim, Covell & Tummino LLP (57) ABSTRACT

A folding table device (20) for a vehicle seat comprises a table top (22), an articulated arm (24), an articulation (26), an airbag (38) as well as an inflator (42) connected to the airbag (38) by means of which the airbag (38) is inflatable. The table top (22) can be adjusted via the articulation (26) including the articulated arm (24) about a pivot axis (S) from a rest position into a use position and from the use position into the rest position. Further, the airbag (38) and the inflator (42) are attached to the table top (22). Accordingly, the distance (a) of the center of gravity (54) of the inflator (42) from the pivot axis (S) is smaller than the distance (A) of the center of gravity (56) of the folded airbag (38) from the pivot axis (S). In addition, there is provided a vehicle comprising a vehicle seat and a folding table device (20) of this type.

12 Claims, 6 Drawing Sheets

(51) Int. Cl.
*B60R 21/217* (2011.01)
*B60R 21/231* (2011.01)

(56) References Cited

FOREIGN PATENT DOCUMENTS

| | | | | |
|---|---|---|---|---|
| DE | 10361227 A1 | 7/2005 | | |
| DE | 102012221533 A1 * | 5/2014 | ............ | B60R 21/02 |
| DE | 102018125554 A1 | 4/2019 | | |
| DE | 102018125770 A1 | 4/2019 | | |
| DE | 102017128097 A1 | 5/2019 | | |
| DE | 102018214880 A1 | 3/2020 | | |
| DE | 102018215199 A1 | 3/2020 | | |
| DE | 102019118842 A1 | 1/2021 | | |
| DE | 102019210001 A1 * | 1/2021 | ............ | B60N 2/005 |
| DE | 102020108388 A1 | 9/2021 | | |
| DE | 102020117111 A1 * | 12/2021 | | |
| DE | 102021123143 A1 * | 3/2023 | ......... | B60N 2/02246 |
| KR | 20230175289 A * | 12/2023 | | |
| WO | 2018/167899 A1 | 9/2018 | | |
| WO | WO-2019244767 A1 * | 12/2019 | | |

\* cited by examiner

FOLDING TABLE DEVICE AND VEHICLE HAVING A FOLDING TABLE DEVICE

RELATED APPLICATIONS

This application is a U.S. National Stage Application filed under 35 USC 371, claiming priority to Serial No. PCT/EP2022/060531, filed on 21 Apr. 2022; which claims priority from German Patent Application DE 10 2021 111 034.3, filed 29 Apr. 2021, the entireties of which are hereby incorporated herein by reference.

TECHNICAL FIELD

The invention relates to a folding table device for a vehicle seat, comprising a table top, an articulated arm, an articulation, an airbag as well as an inflator connected to the airbag by means of which the airbag is inflatable. The table top is adjustable via the articulation including the articulated arm about a pivot axis from a rest position into a use position and from the use position into the rest position. Further, the airbag and the inflator are attached to the table top.

BACKGROUND

Moreover, the invention relates to a vehicle comprising a vehicle seat and a folding table device of this type.

Folding table devices for vehicle seats are well-known. Furthermore, vehicles comprising those folding table devices are well-known.

A folding table device of this type usually includes a table top which a vehicle occupant sitting in the vehicle seat can use as a table surface or tray which is disposed directly in front of the vehicle occupant as if the vehicle occupant is sitting at a table. This position is the use position of the table top. Unless the vehicle occupant requires the table top, the latter can be adjusted about a pivot axis into a rest position in which it is disposed next to the vehicle seat and does not hinder the vehicle occupant when he/she takes a seat in the vehicle seat, for example.

In modern vehicles, airbag modules including an airbag and an inflator which improve the protective effect of the vehicle occupant protection system for the vehicle occupant sitting in the respective vehicle seat during a case of restraint, such as a collision, are mounted on the table top as part of a vehicle occupant protection system.

The additional mass of the airbag modules results in the fact, however, that a higher force is required to adjust the table top. In the case of manually adjustable folding table devices, this reduces the convenience for the vehicle occupant, while in automatically adjustable folding table devices correspondingly powerful drives are required.

SUMMARY

It is the problem of the invention to provide a folding table device comprising a table top that is adjustable with little effort. It is another problem of the invention to provide a vehicle comprising a vehicle seat and a folding table device of this type.

The problem is solved by a folding table device for a vehicle seat comprising a table top, an articulated arm, an articulation, an airbag and an inflator connected to the airbag by means of which the airbag is inflatable. The table top is adjustable via the articulation including the articulated arm about a pivot axis from a rest position to a use position and from the use position to the rest position. Further, the airbag and the inflator are attached to the table top. Here, the distance of the center of gravity of the inflator from the pivot axis is smaller than the distance of the center of gravity of the folded airbag from the pivot axis.

According to the invention, it was found that the force required to adjust the table top can be reduced by arranging the center of gravity of the inflator to be closer to the pivot axis, while the airbag remains in its intended position and, thus, can provide its protective effect without any limitation.

For this purpose, in one embodiment, the inflator can be disposed outside the airbag, whereby the center of gravity of the inflator can be positioned closer to the pivot axis and, consequently, the center of gravity of the table top, together with the airbag and the inflator, is closer to the pivot axis.

In another embodiment, the inflator is connected to the airbag via a gas lance system. In this way, the inflator can be disposed at a distance from the airbag, whereby it can be arranged specifically far from the airbag and, consequently, specifically close to the pivot axis.

It is optionally provided that the folding table device includes an auxiliary airbag attached to the table top. Accordingly, the auxiliary airbag is fluid-connected to the inflator and is inflatable by means of the latter to provide a protective effect in the case of restraint. By providing a common inflator for the airbag and the auxiliary airbag, the mass of the combination of the table top, the airbag, the auxiliary airbag and the inflator can be minimized. Furthermore, this design allows the center of gravity of this combination to be specifically close to the pivot axis, whereby the table top can be adjusted with little effort.

Accordingly, the inflator can be connected to the airbag and the auxiliary airbag via a gas lance system. The gas lance system includes a first gas lance through which the airbag is connected to the inflator, and a second gas lance through which the auxiliary airbag is connected to the inflator. Through the gas lance system, the airbag and the auxiliary airbag can be inflated efficiently and reliably.

Furthermore, the first gas lance can be provided to be designed so that the airbag is inflated by the inflator at a first volume flow and/or a first pressure, and the second gas lance to be designed so that the auxiliary airbag is inflated by the inflator at a second volume flow and/or a second pressure. In particular, in this case the first volume flow is different from the second volume flow and, resp., the first pressure is different from the second pressure. In this way, the design of the first and second gas lances can help adjust and control, respectively, how the respective airbag and auxiliary airbag are inflated to provide a particularly high protective effect in the case of restraint.

Accordingly, the first gas lance and the second gas lance can be different from each other with respect to a flow cross-section, a number of outlet openings and/or the cross-sectional area of the individual outlet openings. Via those parameters of the gas lances, the way in which the airbag and the auxiliary airbag are individually inflated in the case of restraint can be adjusted reliably and with little effort.

According to one embodiment, the folding table device includes an auxiliary airbag and an auxiliary airbag inflator connected to the auxiliary airbag by means of which the auxiliary airbag is inflatable. The auxiliary airbag and the auxiliary airbag inflator are attached to the table top. This design offers the advantage that for the auxiliary airbag an auxiliary airbag inflator is provided which is separate from the inflator of the airbag. Hence, the auxiliary airbag can be positioned together with the auxiliary airbag inflator independently of the inflator of the airbag. Further, the auxiliary airbag inflator can be triggered independently of the inflator of the airbag and can be designed to be particularly efficient and powerful. Moreover, no gas lance system is required to connect the airbag and the auxiliary airbag to a common inflator.

According to another embodiment, the airbag and the auxiliary airbag are disposed, in the non-inflated state, on the table top in such a way that the airbag and the auxiliary airbag do not overlap each other in the use position as seen in the vertical direction. This means that the airbag and the secondary airbag are not arranged vertically on top of each other in the use position in which the table top is usually horizontally oriented. In this way, the table top together with the airbag and the secondary airbag can have a particularly flat design.

The auxiliary airbag can further be provided, in the inflated state, to be located below the table top in a clearance between the pelvis and/or the thighs of the vehicle occupant and to fill the table top. In other words, the auxiliary airbag forms a pelvic restraint airbag.

In addition, or as an alternative, the airbag in the inflated state can be located above the table top and can have a baffle for the head of the vehicle occupant. In other words, the airbag forms a front airbag.

According to the invention, for solving the above-mentioned problem also a vehicle comprising a vehicle seat and a folding table device according to the invention offering the afore-mentioned advantages is provided.

BRIEF DESCRIPTION OF THE DRAWINGS

Further advantages and features will be evident from the following description and from the attached drawings, wherein.

DESCRIPTION

Figure 1:
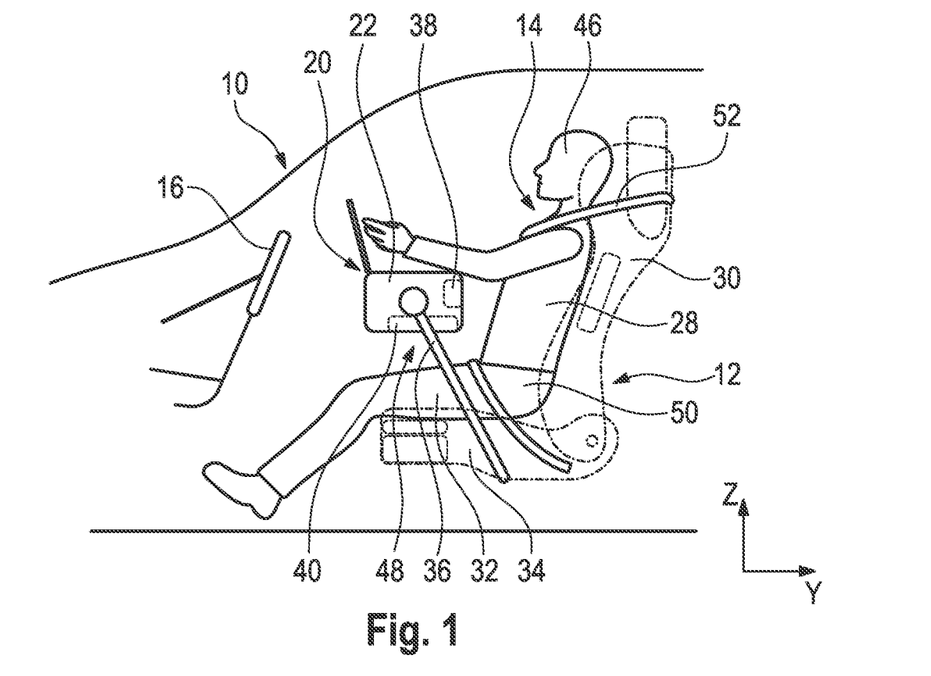
FIG. 1 shows a schematic side view of a cutout of a vehicle according to the invention comprising a folding table device according to the invention in a use position.
Figure 2:
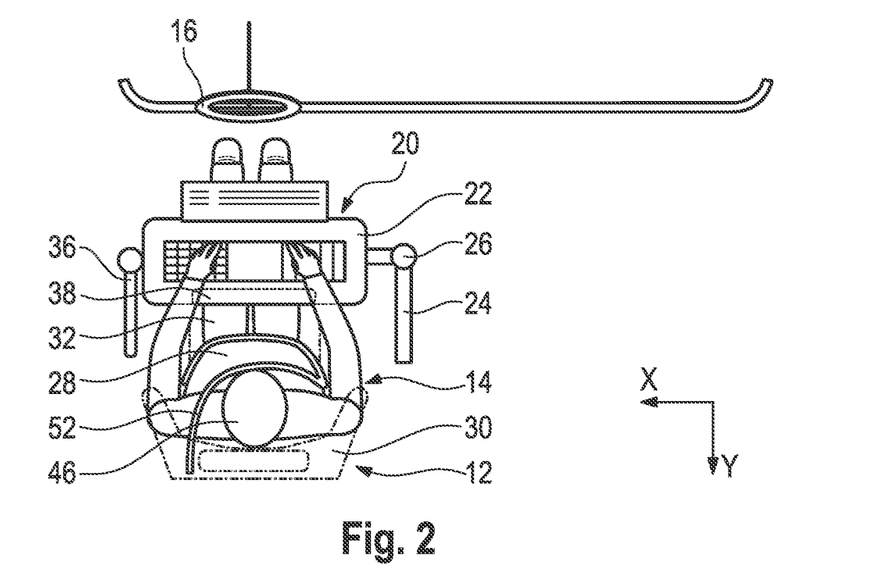
FIG. 2 shows a schematic top view of the folding table device of FIG. 1 in the use position.

In FIGS. 1 and 2, a cutout of a vehicle 10 comprising a folding table device 20 is illustrated.

The vehicle 10 is an automotive vehicle such as a passenger car.

The folding table device 20 here is associated with a vehicle seat 12 of the vehicle 10 and is arranged to be used by a vehicle occupant 14 sitting in the vehicle seat 12.

In the illustrated embodiment, the vehicle seat 12 is a driver seat of the vehicle 10 which is disposed facing a steering wheel 16 of the vehicle 10.

Basically, the folding table device 20 may be associated with any vehicle seat 12 and with a vehicle occupant 14 sitting in the same, such as a passenger seat or a seat in the rear of the vehicle 10.

The folding table device 20 includes a table top 22 as well as an articulated arm 24 and an articulation 26 via which the table top 22 is fastened to be adjustable on the vehicle seat 12.

Accordingly, the table top 22 is adjustable by the articulation 26 about a pivot axis S (see FIGS. 5 and 6) between a use position and a rest position.

In the use position, the table top 22 extends in front of the vehicle occupant 14 (see FIG. 3) so that the thorax 28 of the vehicle occupant 14 is arranged between the table top 22 and a seatback 30 of the vehicle seat 12, and the thighs 32 of the vehicle occupant 14 are located between the table top 22 and a seat cushion 34 of the vehicle seat 12.

Figure 3:
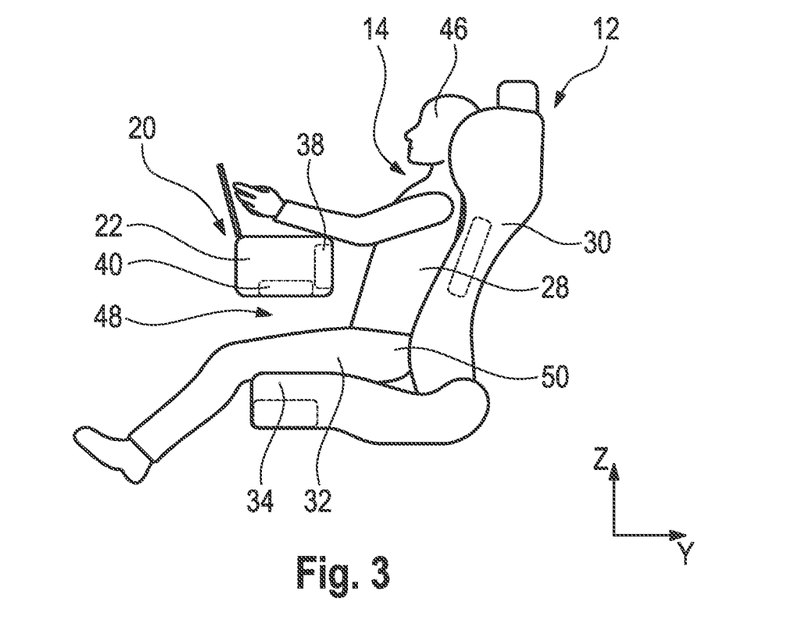
FIG. 3 shows a schematic side view of the folding table device of FIG. 1 in the use position, wherein an airbag and an auxiliary airbag of the folding table device are illustrated in a non-triggered state.

In particular, in the use position the table top 22 is oriented substantially horizontally, i.e., in parallel to the X-Y plane, and/or substantially in parallel to the seat cushion 34 so that the vehicle occupant 14 can use the table top 22 as a table or tray.

In the rest position, the table top 22 in the present embodiment is next to the vehicle seat 12 and is oriented substantially vertically (see FIG. 5), i.e., in parallel to the Y-Z plane, and is thus pivoted about the pivot axis S by an angle of 90° relative to the use position.

Figure 5:
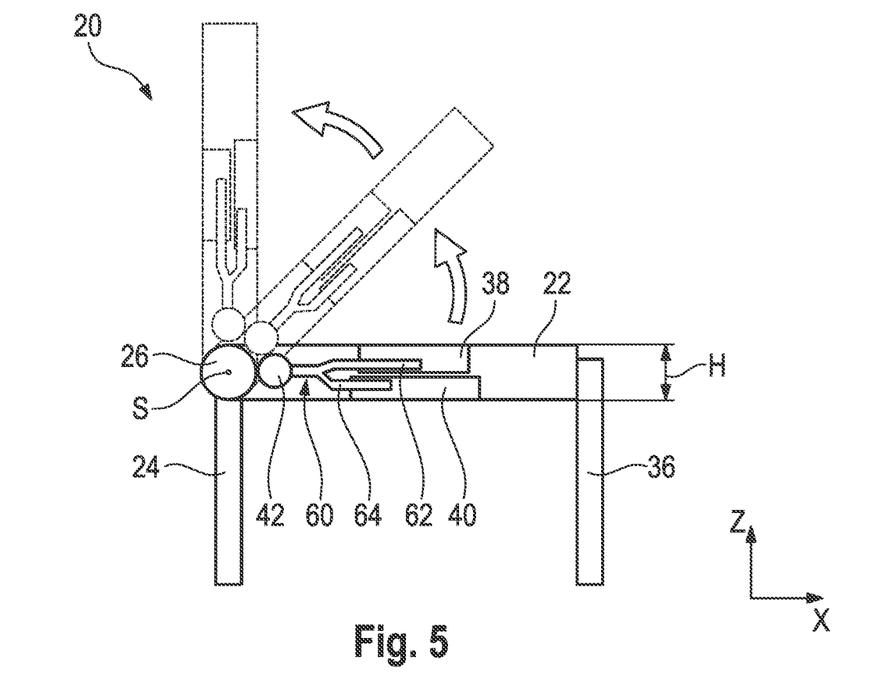
FIG. 5 shows a schematic front view of the folding table device of FIG. 1 in the use position, wherein additionally an intermediate position and a rest position are illustrated.

In FIG. 5, the rest position and the intermediate position are shown in broken lines. The intermediate position in this case is a position which the table top 22 takes when it is adjusted from the use position to the rest position, as illustrated by the arrows.

As a matter of course, in an alternative embodiment, the folding table device 20 can show any use position and any rest position.

Basically, the folding table device 20 can be designed so that the table top 22 is adjustable in a further way, such as about a further pivot axis to adjust the table top 22 into the rest position or from the rest position into another position, such as a storage position in which the table top 22 is stored in an appropriate holder at the vehicle seat 12.

The table top 22 can be adjusted, for example, manually, or via a table adjusting mechanism mechanically, electromechanically or electrically.

The folding table device 20 further includes a retaining unit 36 by means of which the table top 22 can be locked in the use position.

The retaining unit 36 is arranged opposite to the articulation 26, which ensures that the table top 22 is fastened in a particularly stable manner in the locked state.

In addition, the folding table device 20 includes an airbag 38, an auxiliary airbag 40 and an inflator 42 (see FIG. 5), each being fastened to the table top 22.

Figure 4:
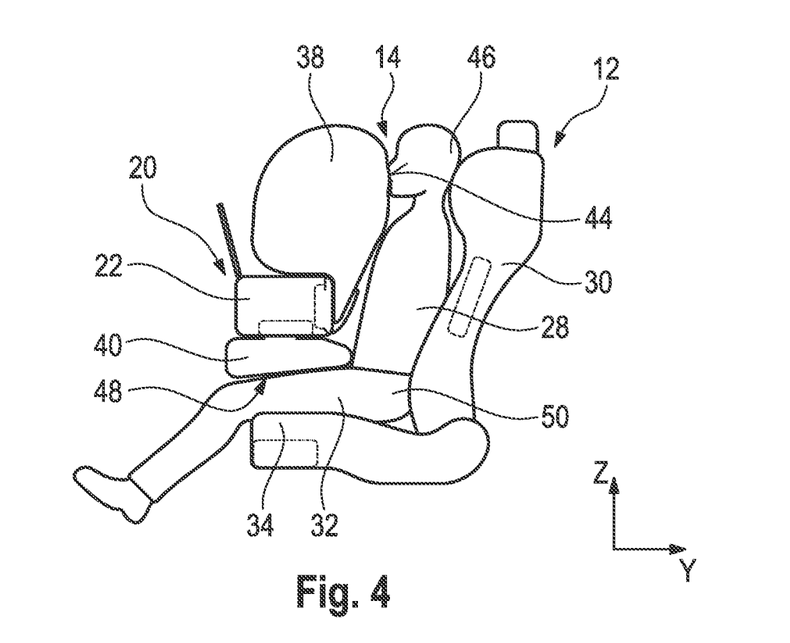
FIG. 4 shows a schematic side view of the folding table device of FIG. 1 in the use position, wherein the airbag and the auxiliary airbag of the folding table device are illustrated in an inflated state.

The airbags 38, 40 are illustrated in the FIGS. 1 to 3 and in the FIGS. 5 to 11 in the folded, i.e., non-triggered state, while in FIG. 4 the airbags 38, 40 are shown in an inflated state. Unless described otherwise, hereinafter the folded state of the airbags 38, 40 shall be referred to.

In the present embodiment, the airbag 38 is a front airbag which in the inflated state (see FIG. 4) is arranged in the vertical direction Z above the table top 22 and provides a baffle 44 for the head 46 of the vehicle occupant 14.

The auxiliary airbag 40 in this case is a pelvic restraint airbag which in the inflated state (see FIG. 4) is arranged in a clearance 48 delimited by the thighs 32 and the pelvis 50 of the vehicle occupant 14 as well as by the table top 22 and preferably extends at least in the longitudinal direction Y completely over the table top 22.

In an alternative embodiment, the auxiliary airbag 40 in the inflated state completely fills the clearance 48 or the table top 22.

Basically, the folding table device 20 may have any number of airbags 38, 40 which are fastened to the table top 22, but a minimum of one airbag. In addition, or as an alternative, each of the airbags 38, 40 may be any type of airbag.

In particular, the folding table device 20 in one embodiment includes merely one single airbag 38, for example in the form of a pelvic restraint airbag.

The airbags 38, 40 are part of a vehicle occupant protection system of the vehicle 10 which in the shown embodiment comprises a seatbelt system 52 in the form of a three-point seatbelt for the vehicle occupant 14.

In an alternative embodiment, no seatbelt system or any seatbelt system 52 such as a lap belt may be provided for the vehicle occupant 14.

The activation of the airbags 38, 40 is preferably performed in the use position only and is ensured specifically by an appropriately designed control unit of the vehicle occupant protection system of the vehicle 10.

Figure 6:
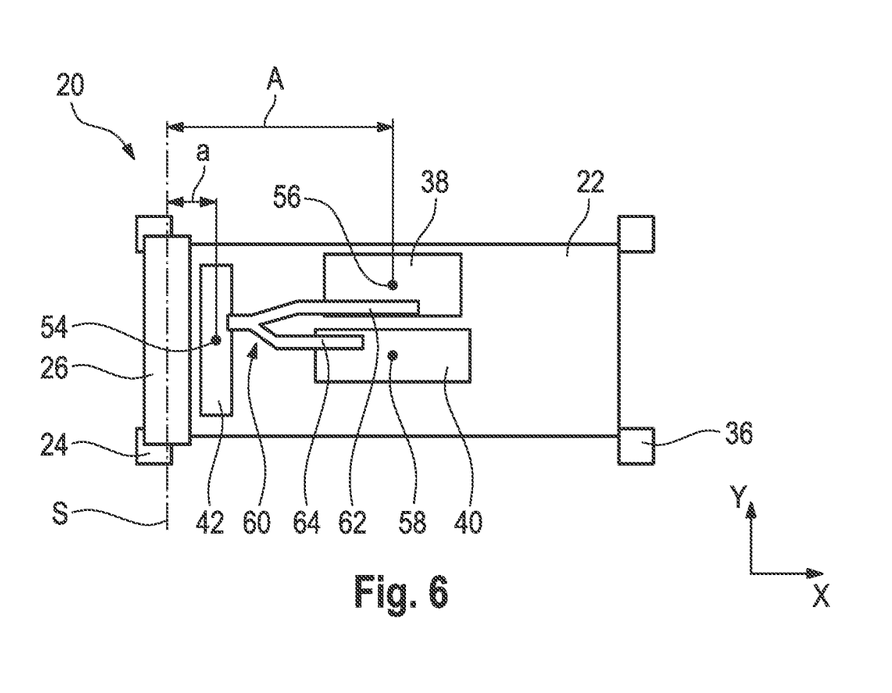
FIG. 6 shows a schematic top view of the folding table device of FIG. 5 in the use position.
Figure 7:
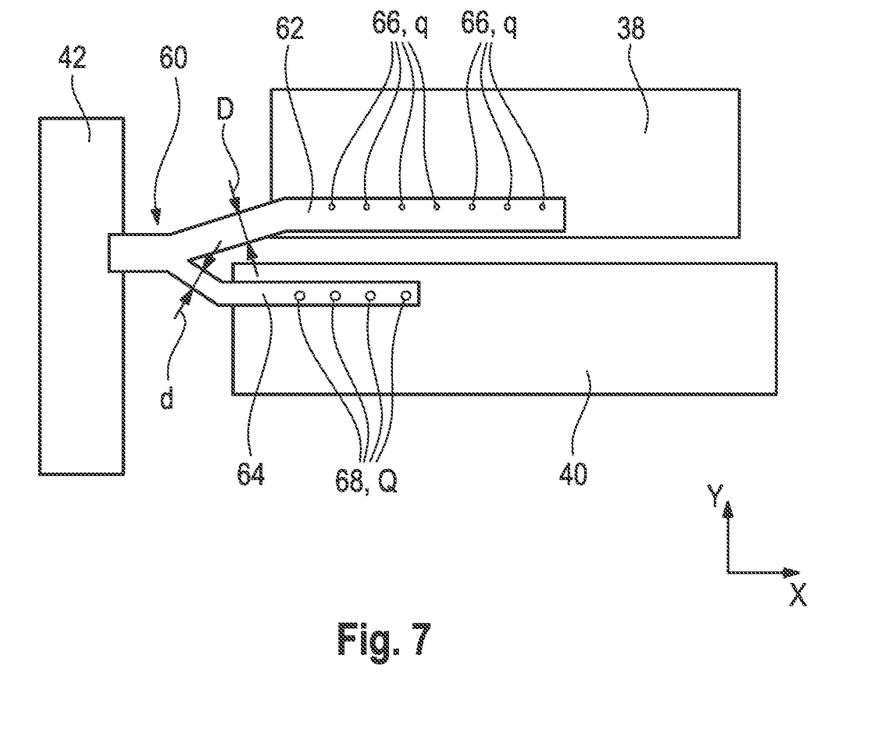
FIG. 7 shows a schematic top view of the airbag, the auxiliary airbag, an inflator and a gas lance system of the folding table device of FIG. 5.

By means of FIGS. 5 to 7, the structure of the folding table device 20 is described in detail, particularly with respect to the arrangement of the airbags 38, 40 and the inflator 42.

The airbags 38, 40 are disposed on the table top 22 in the transverse direction X centrally facing the vehicle occupant 14, while the inflator 42 is disposed adjacent to the articulation 26, i.e., between the articulation 26 and the airbags 38, 40.

Further, the airbags 38, 40 are arranged one behind the other in the longitudinal direction Y, which means that they do not overlap as seen in the vertical direction Z (see FIG. 6). Due to this design, the table top 22 and, resp., the combination of the table top 22 and the airbags 38, 40 has a height H (see FIG. 5) which is particularly small.

In this context, each of the airbags 38, 40 in the vertical direction Z has a specifically flat design and is aligned with the table top 22. In particular, the height in the vertical direction Z of each of the airbag 38 and the auxiliary airbag 40 is smaller than the width in the transverse direction X and is smaller than the length in the longitudinal direction Y of the respective airbag 38, 40.

The inflator 42 is designed separately from the airbags 38, 40 and is arranged spaced apart from them.

Moreover, the inflator 42 is cylinder-shaped and is aligned with the table top 22 such that the height of the cylinder extends in the longitudinal direction Y.

Basically, each of the inflator 42, the airbag 38 and the auxiliary airbag 40 can have any design and can be freely arranged at the table top 22.

In all embodiments, the inflator 42 and the airbag 38 are arranged at the table top 22 in such a way, however, that the distance a of the center of gravity 54 of the inflator 42 from the pivot axis S is smaller than the distance A of the center of gravity 56 of the airbag 38 from the pivot axis S. In other words, the center of gravity 54 of the inflator 42 is arranged to be closer to the pivot axis S than the center of gravity 56 of the airbag 38.

The center of gravity 58 of the auxiliary airbag 40 is also arranged at the distance A from the pivot axis S and, thus, is further distant from the pivot axis S than the center of gravity 54 of the inflator 42.

Basically, the auxiliary airbag 40 can be arranged at any distance from the pivot axis S, preferably the center of gravity 54 of the inflator 42 is arranged to be closer to the pivot axis S than the center of gravity 58 of the auxiliary airbag 40, however.

In the embodiment shown in FIGS. 5 to 7, the folding table device 20 includes a gas lance system 60 through which the airbags 38, 40 are fluid-connected to the inflator 42 and, thus, can be inflated by the latter.

Accordingly, the airbag 38 is fluid-connected via a first gas lance 62 of the gas lance system 60 and the auxiliary airbag 40 is fluid-connected via a second gas lance 64 of the gas lance system 60 to the inflator 42.

As illustrated in FIG. 7, the first gas lance 62 has a first flow cross-section D as well as seven first outlet openings 66 each having a first cross-sectional area q, and the second gas lance 64 has a second flow cross-section d as well as four second outlet openings 68 each having a second cross-sectional area Q. The number of the outlet openings 66, 68 is not intended to be limiting here. The first flow cross-section D is larger than the second flow cross-section d, while the first cross-sectional areas q are smaller than the respective second cross-sectional areas Q.

In this way, in the case of restraint, the airbag 38 is inflated through the first gas lance 62 by the inflator 42 at a first volume flow and a first pressure, whereas the auxiliary airbag 40 is inflated by the inflator 42 at a second volume flow and a second pressure different from the first volume flow and from the first pressure, respectively.

Basically, each of the first gas lance 62 and the second gas lance 64 may have any design, specifically with respect to the flow cross-section d, D, the number of the outlet openings 66, 68 and/or the cross-sectional areas q, Q, so that in the case of restraint the airbags 38, 40 can be inflated individually corresponding to specific requirements.

Figure 8:
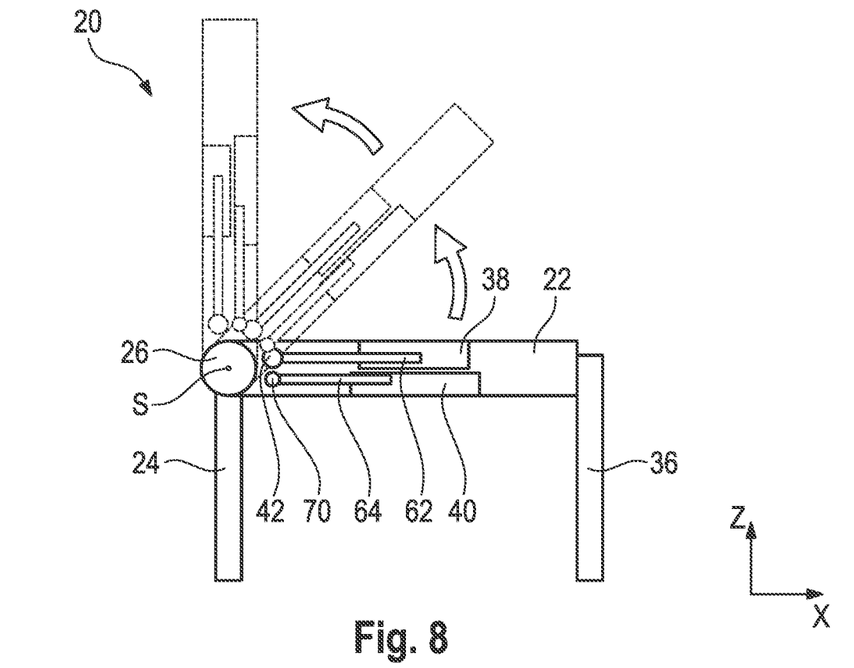
FIG. 8 shows a schematic front view of the folding table device of FIG. 1 according to another embodiment, wherein the folding table device is illustrated in the use position, in an intermediate position and in a rest position.
Figure 9:
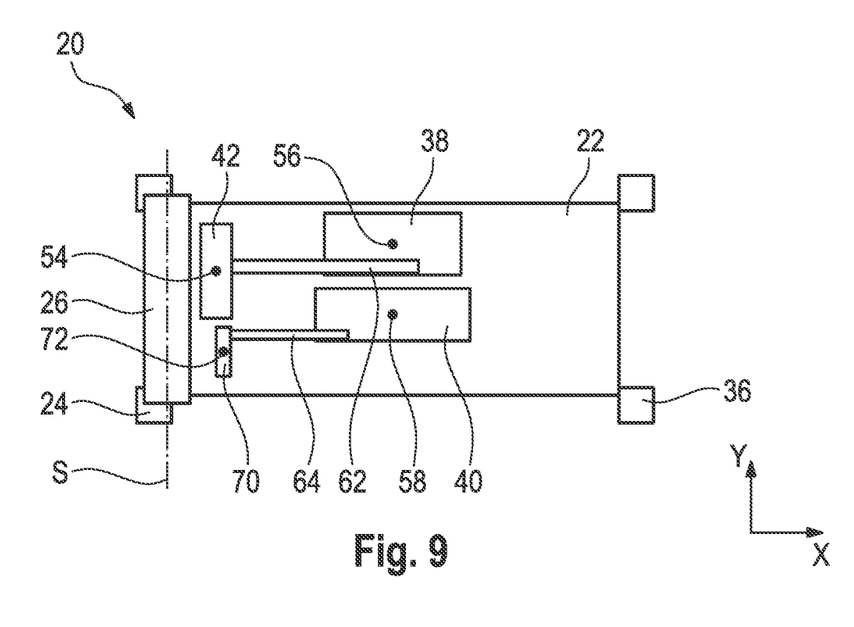
FIG. 9 shows a schematic top view of the folding table device of FIG. 8 in the use position.

By means of FIGS. 8 and 9, the structure of the folding table device 20 is described according to another embodiment. For the components which are known from the preceding embodiment the same reference symbols are used, and the previous explanations are referred to in this respect.

Unlike the embodiment illustrated in FIGS. 5 to 7, the folding table device 20 in the embodiment shown in FIGS. 8 and 9 includes an auxiliary airbag inflator 70 to which the auxiliary airbag 40 is fluid-connected through the second gas lance 64, while the inflator 42 is fluid-connected to the airbag 38 through the first gas lance 62.

In this way, a separate inflator 42, 70 which inflates the respective airbag 38, 40 in the case of restraint is associated with each of the airbags 38, 40. Concretely, this means that the airbag 38 is inflated by the inflator 42 through the first gas lance 62, while the auxiliary airbag 40 is inflated by the auxiliary airbag inflator 70 through the second gas lance 64.

The auxiliary airbag 40 and the auxiliary airbag inflator 70 are arranged analogously to the airbag 38 and the inflator 42, i.e., so that the center of gravity 72 of the auxiliary airbag inflator 70 is arranged to be closer to the pivot axis S than the center of gravity 58 of the auxiliary airbag 40.

Further, the inflators 42, 70 are arranged one behind the other in the longitudinal direction Y, which means that they do not overlap as seen in the vertical direction Z (see FIG. 9) and the combination of the table top 22 and the inflators 42, 70 is designed to be particularly flat in the vertical direction Z.

Figure 10:
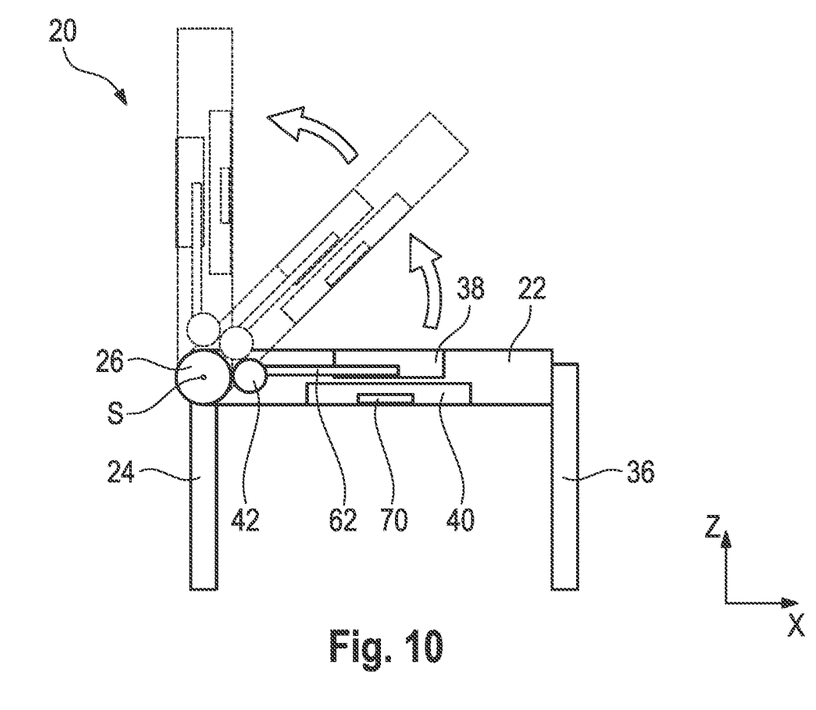
FIG. 10 shows a schematic front view of the folding table device of FIG. 1 according to another embodiment, wherein the folding table device is illustrated in the use position, in an intermediate position and in a rest position.
Figure 11:
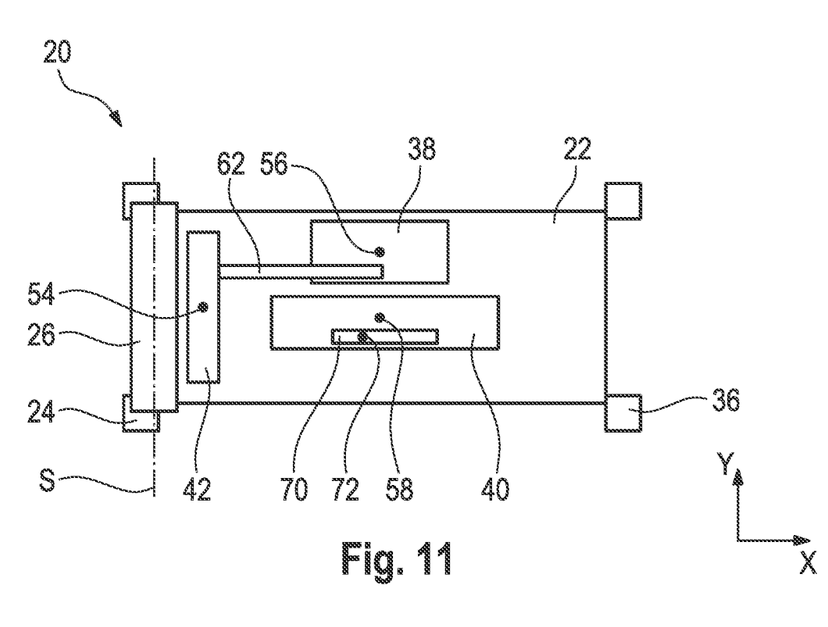
FIG. 11 shows a schematic top view of the folding table device of FIG. 10 in the use position.

By means of FIGS. 10 and 11, now the structure of the folding table device 20 is described according to another embodiment. For the components which are known from the preceding embodiments the same reference symbols are used, and reference is made to the previous explanations in this respect.

Unlike the embodiment illustrated in FIGS. 8 and 9, the auxiliary airbag inflator 70 in the embodiment illustrated in FIGS. 10 and 11 is not fluid-connected to the auxiliary airbag 40 through a gas lance but is arranged inside the auxiliary airbag 40 or directly adjacent to the auxiliary airbag 40 and is appropriately fluid-connected to the latter.

In this case, too, the center of gravity 72 of the auxiliary airbag inflator 70 is preferably arranged to be closer to the pivot axis S than the center of gravity 58 of the auxiliary airbag 40.

In this way, there is provided a folding table device 20 as well as a vehicle 10 comprising such folding table device 20 the table top 22 of which in all embodiments can be adjusted with little effort between the rest position and the use position, as the common center of gravity of the table top 22, the airbags 38, 40 and the inflators 42, 70 is arranged to be particularly close to the pivot axis S.

Furthermore, the combination of the table top 22, the airbags 38, 40 and the inflators 42, 70 may have a particularly flat design in the vertical direction Z.

The invention is not limited to the illustrated embodiments. In particular, individual features of one embodiment can be combined freely with features of other embodiments, particularly independently of the other features of the respective embodiments.

The invention claimed is:

1. A folding table device for a vehicle seat, comprising a table top, an articulated arm, an articulation, an airbag as well as an inflator connected to the airbag by means of which the airbag can be inflated,
    wherein the table top can be adjusted via the articulation including the articulated arm about a pivot axis from a rest position into a use position and from the use position into the rest position, and
    the airbag and the inflator are attached to the table top,
    wherein the distance of the center of gravity of the inflator from the pivot axis is smaller than the distance of the center of gravity of the folded airbag from the pivot axis.

2. The folding table device according to claim 1, wherein the inflator is arranged outside the airbag.

3. The folding table device according to claim 1, wherein the inflator is connected to the airbag through a gas lance system.

4. The folding table device according to claim 1, wherein the folding table device includes an auxiliary airbag which is attached to the table top, wherein the auxiliary airbag is fluid-connected to and is inflatable by the inflator.

5. The folding table device according to claim 4, wherein the inflator is connected to the airbag and the auxiliary airbag through a gas lance system, wherein the gas lance system includes a first gas lance through which the airbag is connected to the inflator and a second gas lance through which the auxiliary airbag is connected to the inflator.

6. The folding table device according to claim 5, wherein the first gas lance is designed so that the airbag is inflated by the inflator at a first volume flow and/or a first pressure, and the second gas lance is designed so that the auxiliary airbag is inflated by the inflator at a second volume flow and/or a second pressure.

7. The folding table device according to claim 6, wherein the first gas lance and the second gas lance are different from each other with respect to a flow cross-section, a number of outlet openings and/or the cross-sectional area of the individual outlet openings.

8. The folding table device according to claim 1, wherein the folding table device includes an auxiliary airbag and an auxiliary airbag inflator connected to the auxiliary airbag by means of which the auxiliary airbag is inflatable, wherein the auxiliary airbag and the auxiliary airbag inflator are attached to the table top.

9. The folding table device according to claim 4, wherein the airbag and the auxiliary airbag in the non-inflated state are arranged on the table top in such a way that in the use position, as seen in the vertical direction, the airbag and the auxiliary airbag do not overlap each other.

10. The folding table device according to claim 4, wherein the auxiliary airbag in the inflated state is located below the table top in a clearance between the pelvis and/or the thighs of the vehicle occupant and fills the table top.

11. The folding table device according to claim 1, wherein the airbag in the inflated state is located above the table top and includes a baffle for the head of the vehicle occupant.

12. A vehicle comprising a vehicle seat and a folding table device according to claim 1.

* * * * *